(12) United States Patent
Lu et al.

(10) Patent No.: US 8,255,717 B2
(45) Date of Patent: Aug. 28, 2012

(54) ELECTRONIC DEVICE AND POWER MANAGEMENT METHOD FOR AUDIO CONTROL SYSTEM THEREOF

(75) Inventors: Yen-Kuang Lu, Taoyuan (TW); Mien-Chih Chen, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 405 days.

(21) Appl. No.: 12/685,046

(22) Filed: Jan. 11, 2010

(65) Prior Publication Data
US 2010/0235661 A1    Sep. 16, 2010

(30) Foreign Application Priority Data
Mar. 13, 2009   (CN) .......................... 2009 1 0300840

(51) Int. Cl.
*G06F 1/26* (2006.01)
*G06F 1/32* (2006.01)

(52) U.S. Cl. ........................................................ 713/320
(58) Field of Classification Search .................. 713/320
See application file for complete search history.

(56) References Cited

U.S. PATENT DOCUMENTS

| | | | |
|---|---|---|---|
| 7,742,587 B2* | 6/2010 | Cohen ....................... 379/202.01 |
| 2006/0277564 A1* | 12/2006 | Jarman .......................... 725/25 |
| 2007/0129828 A1* | 6/2007 | Lee et al. ......................... 700/94 |
| 2009/0110206 A1* | 4/2009 | Haggis et al. ................... 381/58 |
| 2009/0204404 A1* | 8/2009 | Jarman et al. ................. 704/260 |
| 2010/0158274 A1* | 6/2010 | Suvanto et al. ............... 381/103 |

FOREIGN PATENT DOCUMENTS

TW              231143            9/1994

* cited by examiner

*Primary Examiner* — Mohammed Rehman
(74) *Attorney, Agent, or Firm* — Altis Law Group, Inc.

(57) ABSTRACT

An audio control system and method of an electronic device receives audio streams, but does not play the audio streams when one or more applications are in a mute mode. The system and method mixes the one or more of the audio streams if the volume of the one or more audio streams is not zero, and transmits the mixed audio streams to an audio processor of the electronic device.

15 Claims, 2 Drawing Sheets

ELECTRONIC DEVICE AND POWER MANAGEMENT METHOD FOR AUDIO CONTROL SYSTEM THEREOF

BACKGROUND

1. Technical Field

Embodiments of the present disclosure relate to power management, and more particularly to an electronic device and power management method for an audio control system of the electronic device.

2. Description of Related Art

Electronic devices, such as personal digital assistants (PDA), mobile phones, digital cameras (DC) and handheld computers execute media applications to play back audio data via audio control interfaces installed therein.

Many applications utilize audio output capabilities typically available in electronic devices. Operating systems in electronic devices allow users to operate many applications that provide playback of audio streams and other data at the same time.

A frequently used audio playback system in an electronic device includes a plurality of applications playing audio streams, an audio driver, a mixer module and an audio processor. The audio driver is operable to convert the audio streams into a format of the audio stream. The mixer module is operable to mix the audio streams. The audio processor is operable to convert the mixed audio streams from a digital format into an analog format, and then to output the converted audio stream to speakers.

Audio volume controlled by an application can be adjusted according to different situations. However, while the volume can be reduced until the media application is in a mute mode, audio streams continue to be transmitted and executed by the audio program, thus consuming power of the electronic device despite the application remaining in the mute mode.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
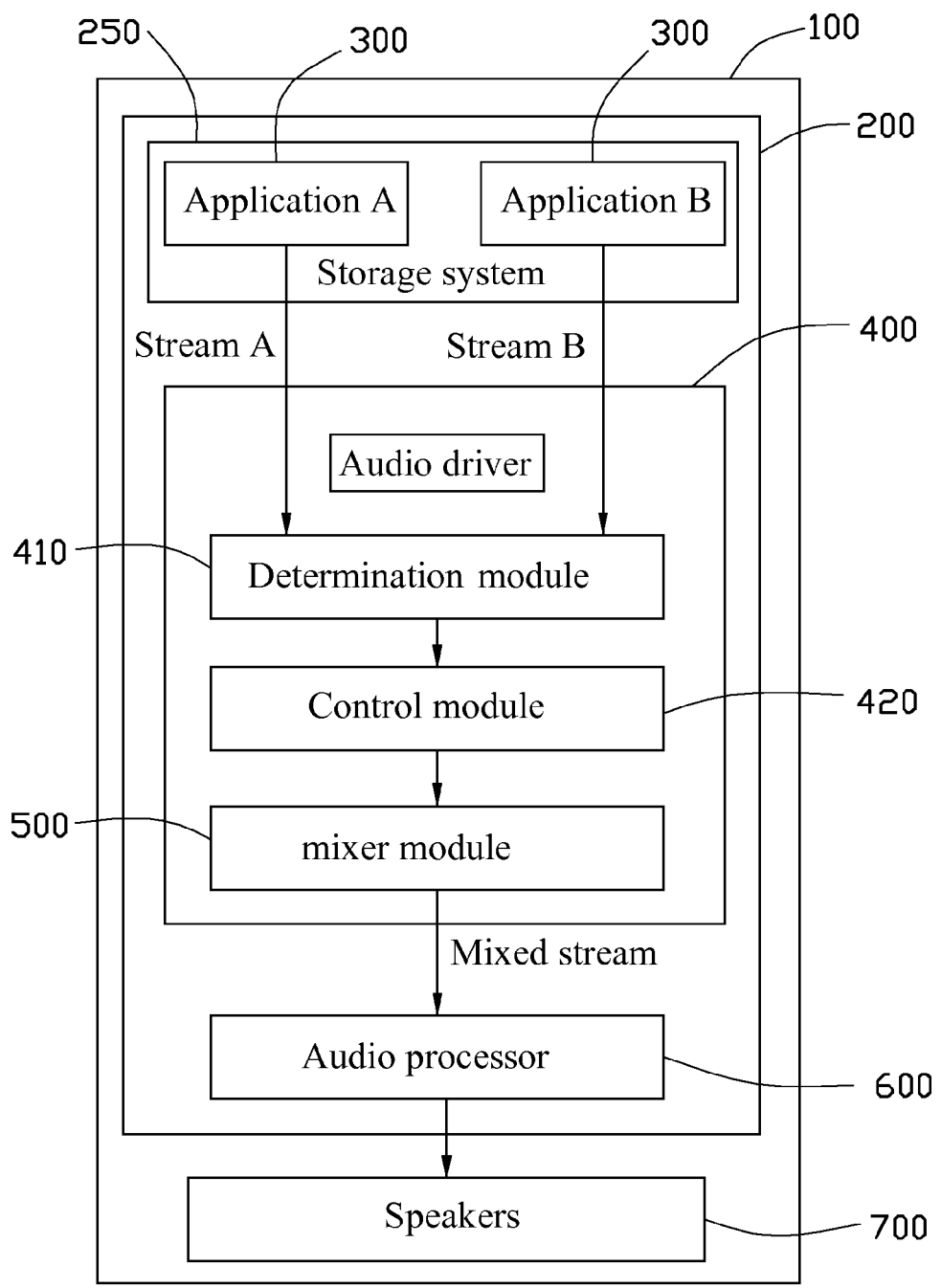
FIG. 1 is a block diagram of one embodiment of an electronic device with power management function for an audio control system.

FIG. 1 is a block diagram of one embodiment of an electronic device 100 including an audio control system 200. The audio control system 200 includes a storage system 250 comprising a plurality of applications 300, an audio driver 400, and an audio processor 600. The audio driver 400 includes a determination module 410, a control module 420, and a mixer module 500. The applications 300 are operable to transmit audio streams to the audio control system 200. The audio control system 200 is operable to receive the audio streams, but does not play the audio streams when the applications 300 are in a mute mode. In one embodiment, the electronic device 100 may be a mobile phone, a personal digital assistant (PDA), a handheld game console, a digital still camera (DSC), or a handheld computer.

In one embodiment, the electronic device 100 may be controlled and coordinated by operating system software, such as UNIX, Linux, Windows 95, 98, NT, 2000, XP, Vista, Mac OS X, an embedded operating system, or any other compatible operating system. In another embodiment, the electronic device 100 may be controlled by a proprietary operating system. Conventional operating systems control and schedule computer processes for execution, perform memory management, provide file system, networking, and I/O services, and provide a user interface, such as a graphical user interface (GUI), among other things.

The applications 300 read audio data from digital media such as CD, DVD, for example, or music files in various audio formats, such as MP3, AAC, AC-3, WMV, WMA, for example, and convert the audio data into audio streams. In one embodiment, the applications 300 send audio steams to the audio driver 400 in a pulse code modulation (PCM) format. The applications 300 may operate in a mute mode or a non-mute mode.

The audio driver 400 includes a determination module 410, a control module 420 and a mixer module 500. The determination module 410 electrically connects to the control module 420 and the mixer module 500.

The determination module 410 receives the audio streams from the applications 300 when the one or more applications 300 are executed. The determination module 410 determines if a volume of each of the one or more audio streams is zero. If the volume is zero, the determination module 410 sends a mute signal to the control module 420. If the volume of one or more of the audio stream is not zero, the determination module 410 sends a non-mute signal to the control module 420. The mute signal indicates that the information of volume of the audio stream is zero. Otherwise, the non-mute signal indicates that the information of volume of the audio stream is not zero to the control module 420.

The control module 420 is operable to generate a mode instruction, to drive to the mixer module 500 according to the signals received from the determination module 410. In one embodiment, the control module 420 receives the audio streams but does not play the received audio streams upon receiving the mute signal from the determination module 410. In another embodiment, the control module 420 sends a non-mute mode instruction to driver the mixer module 500 upon receiving the non-mute signal from the determination module 410.

The mixer module 500 mixes the received audio streams into one audio stream when the applications 300 are in the non-mute mode. The mixed module 500 further sends the mixed audio stream to the audio processor 600. The audio processor 600 coverts the mixed audio stream into analog signals and outputs the analog signals to a speaker 700 of the electronic device 100.

Figure 2:
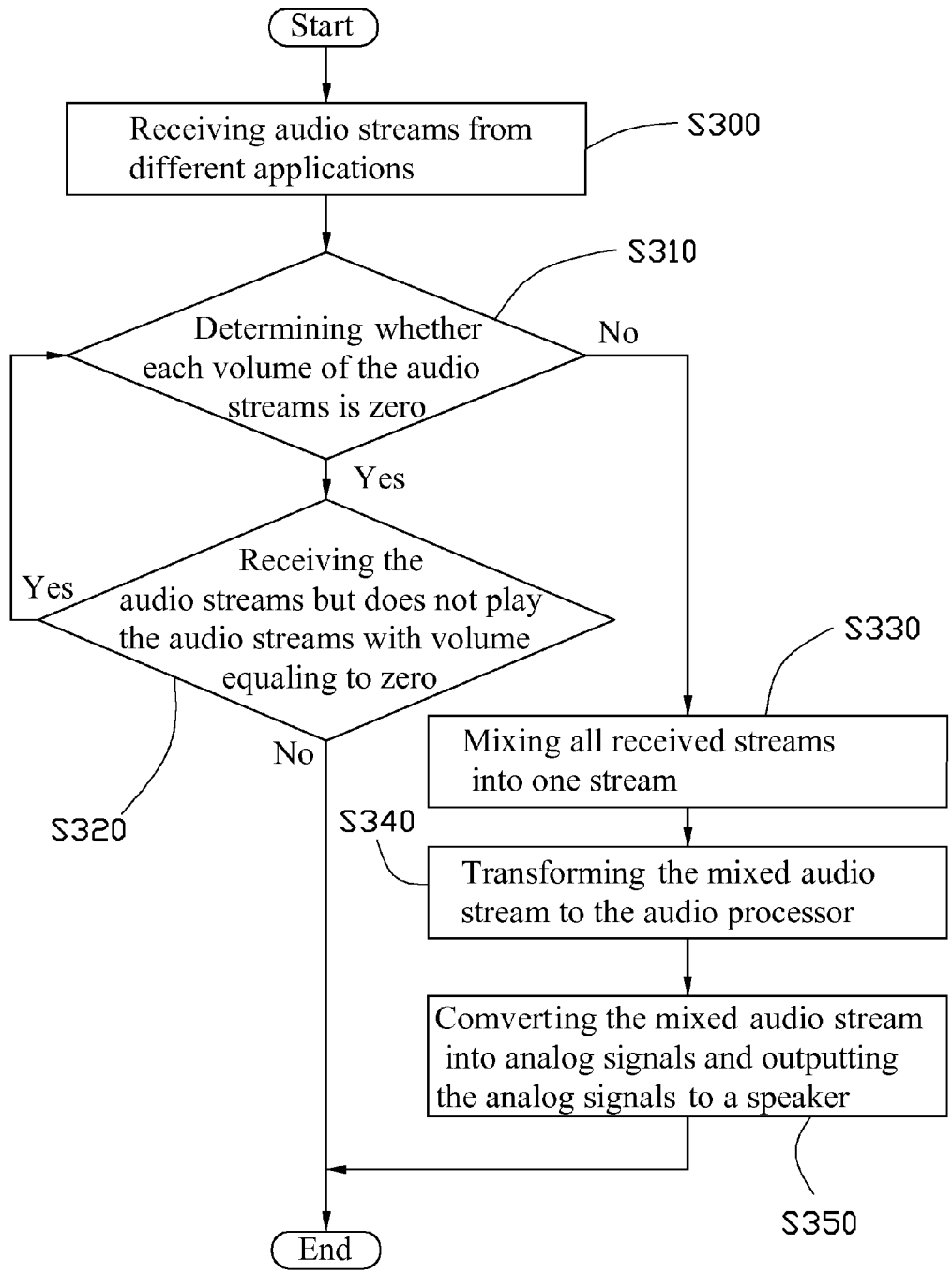
FIG. 2 is a flowchart illustrating one embodiment of a method for power management in an audio control system.

FIG. 2 is a flowchart illustrating one embodiment of a method for power management in the audio control system 200. By detecting the modes of the applications 300, the audio streams may be not played so as to save power consumption by the audio control system 200. Depending on the embodiment, additional blocks in the flow of FIG. 2 may be added, others removed, and the ordering of the blocks may be changed.

In block S300, the audio driver 400 receives audio streams from a plurality of applications 300. In one embodiment, the audio streams are in the pulse code modulation (PCM) format. In other embodiments, the audio streams may be in other formats.

In block S310, the determination module 410 determines whether the volume of the received audio streams is zero.

In block S320, the control module 420 receives the audio streams but does not play the received audio streams and sends the mute signal to the control module 420 upon determining that the volume of the received audio stream is zero. After processing the received audio stream, block S310 is initialized to determine the next received audio stream.

In block S330, the mixer module 500 mixes the audio streams into one audio stream upon determining that the volume of the received audio streams are not zero.

In block S340, the mixer module 500 transmits the mixed audio stream to the audio processor 600.

In block S350, the audio processor 600 converts the mixed audio stream into analog signals and outputs the analog signals to the speakers 700. In the embodiment, the mixer module 500 transmits the mixed audio stream to the audio processor 600 by direct memory access (DMA).

In the present disclosure, the control module 420 receives the audio streams but does not play the received audio stream and sends the mute signal to the control module 420 upon determining that the volume of the received audio stream is zero. In this way, the mixer module 500 and the audio processor 600 does not need to mix and process the audio stream with volume equaling zero. Thus, power consumption of the electronic device 100 is reduced.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A power-saving method for an audio control system of an electrical device, the method comprising:
   receiving one or more audio streams from one or more applications;
   determining if volume of each of the one or more audio streams is zero;
   receiving but not playing the one or more of the audio streams if volume of the one or more audio streams is zero;
   mixing the one or more of the audio streams into one stream if the volume of the one or more audio streams is not zero; and
   transmitting the mixed audio streams to an audio processor of the electronic device.

2. The method of claim 1, the method further comprising turning off the audio processor of the electronic device if the volume of all of the one or more audio streams is zero.

3. The method of claim 1, wherein the one or more applications are multimedia applications.

4. The method of claim 1, wherein a format of the audio stream is a pulse code modulation (PCM).

5. The method of claim 1, wherein the mixed audio stream is transmitted to the audio processor by direct memory access (DMA).

6. An electrical device with a power saving function, the device comprising:
   a storage system comprising one or more applications to process one or more audio steams;
   a determination module to receive the one or more audio streams from the one or more applications and to determine if a volume of each audio streams is zero;
   a control module to receive but not play the audio streams with the volume equaling to zero; and
   a mixer module to mix the one or more audio streams into one stream and to transmit the mixed audio streams to the audio processor if the volume of all of the one or more audio streams is not zero.

7. The device of claim 6, wherein the audio processor of the electronic device is turned off if the volume of all of the audio streams is zero.

8. The device of claim 6, wherein the electrical device is a mobile phone, a digital camera or a PDA.

9. The device of claim 6, wherein the format of audio streams is a PCM.

10. The device of claim 6, wherein the mixed audio streams are transmitted to the audio processor by DMA.

11. A non-transitory storage medium storing a set of instructions, the set of instructions capable of being executed by a processor to perform a power-saving method for an audio control system applicable to an electrical device, the method comprising:
    receiving one or more audio streams from one or more applications;
    determining if volume of each of the one or more audio streams is zero;
    receiving but not playing the one or more of the audio streams if volume of the one or more audio streams is zero
    mixing one or more of the audio streams into one stream if the volume of the one or more audio streams is not zero; and
    transmitting the mixed audio streams to an audio processor of the electronic device.

12. The method of claim 11, wherein the method further comprises turning off the audio processor of the electronic device if the volume of all of the audio streams is zero.

13. The method of claim 11, wherein the applications are multimedia applications.

14. The method of claim 11, wherein a format of the audio stream is a pulse code modulation (PCM).

15. The method of claim 11, wherein the mixed audio stream is transmitted to the audio processor by direct memory access (DMA).

* * * * *